April 3, 1928.  F. E. HANSEN  1,664,816

NOZZLE

Filed Feb. 7, 1927

Inventor
Fred E. Hansen.
Kwis Hudson & Kent
Attys.

UNITED STATES PATENT OFFICE.

Patented Apr. 3, 1928.

1,664,816

FRED E. HANSEN, OF LAKEWOOD, OHIO, ASSIGNOR TO THE HANSEN MANUFACTURING COMPANY, OF CLEVELAND, OHIO, A CORPORATION OF OHIO.

NOZZLE.

Application filed February 7, 1927. Serial No. 166,349.

This invention relates to nozzles, particularly nozzles for use in filling vessels or other liquid containers such, for instance, as the radiators of automobiles.

One object of the invention is the provision of a nozzle having a valve which will open automatically when the nozzle is placed in position over the neck or rim of a container or vessel.

Another object is the provision of means for operating the valve, which will be so housed by the nozzle as to be thoroughly protected against accidental operation or injury when the nozzle is dropped or carelessly thrown about.

A further object is the provision of means to prevent leakage around the operating stem of the valve when the valve is open.

Other objects, and objects relating to details of construction and economies of manufacture, will appear as I proceed with the description of that embodiment of my invention which, for the purposes of the present application, I have illustrated in the accompanying drawings, in which.

Similar reference numerals refer to like parts throughout the views.

Figure 1:
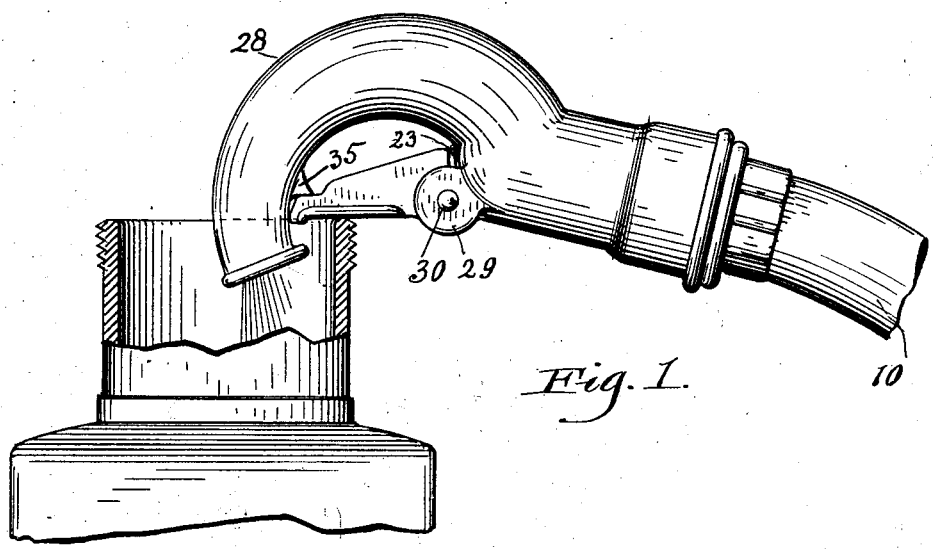
Fig. 1 is an elevational view showing my improved nozzle in position over the edge of the filling neck of an automobile radiator.

In the drawings, 10 represents a flexible hose, into the end of which is inserted a hose connection 11 to which the hose is tightly clamped by a metal band 12. The connection is formed with a threaded end 13 adapted to receive a nozzle. These parts are of the usual form.

The nozzle of this invention has a straight portion 14 adapted to be mounted upon the threaded end 13 of a hose connection such as above described, a packing washer 15 being interposed between the nozzle and connection. The straight portion 14 of the nozzle is provided with a bore 16 axially arranged and with a concentric bore or openranged and with a slightly larger diameter extending 17 of a slightly larger diameter extending through the center of a transverse wall 18 in the nozzle. On the rear side, this wall is circularly grooved to produce an annular valve seat 19 between the groove and the bore 17.

A valve head 20 with a packing ring 21 is adapted to engage the valve seat 19. The valve head 20 is screwed onto a pin 22 on the valve stem 23 and the ring 21 is clamped between the head 20 and a shoulder 24 on the stem 23. The valve stem 23 has a sliding fit in the bore 16. Between the shoulder 24 and that part of the valve stem which slides in the bore 16, there is an enlargement or annular flange 26 which moves in the space 26' in the straight portion of the nozzle between the thick forward end wall 27 and the wall 18.

Figure 3:
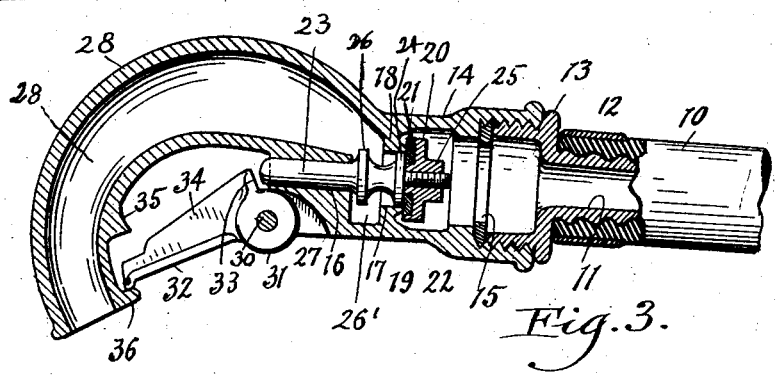
Fig. 3 is a sectional view taken substantially on the line 3—3 of Fig. 2.
Figure 2:
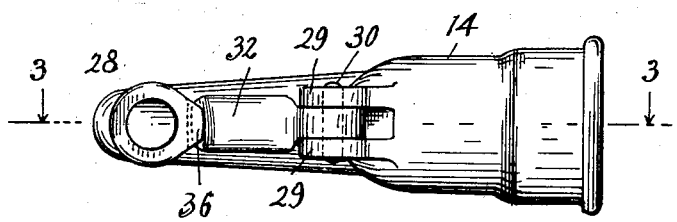
Fig. 2 is a bottom plan view of the nozzle.

The hook-shaped end portion 28 of the nozzle has its passage 28' connected with the space 26', as shown in Fig. 3. From the end wall 27 a pair of spaced ears 29 extend forwardly and are perforated to receive a pin 30 upon which is pivoted a bell-crank lever 31 having a relatively long power arm 32 and a relatively short work arm 33. These two arms are preferably joined by a rib 34 for the purpose of strengthening the lever. The arm 33 of the lever is positioned to engage the protruding end of the stem 23 while the arm 32 is adapted to rest upon the rim of the vessel to be filled as illustrated in Fig. 1, whereupon the weight of the nozzle assisted by a slight pressure from the operator will swing the lever and cause it to move the valve head 20 against the force of the fluid pressure in the hose 10 to its open position. The movement of the arm 32 is limited in one direction by a projection 35 upon the nozzle and in the other direction by a lip 36 which projects from the extremity of the nozzle.

Normally, the pressure of the water or other fluid in the hose line holds the valve tightly against its seat. When it becomes desirable to use the nozzle to fill a vessel, the operator positions it so that the hooked end will extend over the rim of the vessel and the arm 32 of the lever will rest upon the edge of the vessel, as shown in Fig. 1. A slight pressure by the operator will then cause the lever 32 to swing until stopped by the projection 35 and thereby open the valve so that water or other fluid will flow from the hose around the valve head 20 and through bore 17. The fluid will impinge upon the annular flange 26 and will be deflected radially outward instead of flowing straight along the stem where its pressure would tend to carry it into the clearance space between the stem and the bore 16. The space 26' and the passage 28' are of relatively large area compared with the space around the valve head 20 when the valve is open and this fact taken with the deflection of the stream by the flange 26 prevents pressure from building up in the space 26' and leakage around the stem 23 during the time the valve is open is thereby avoided, this being a rather important feature of my invention.

When the vessel is filled, the simple removal of the nozzle from the filling position permits the pressure on the valve head 20 to automatically shut off the flow of fluid. If the nozzle is then thrown onto the ground or pavement, as frequently happens in practice, there is very little danger of the valve operating mechanism suffering injury as the lever 31 is fully protected by the hook-shaped portion of the nozzle. There is also little likelihood that the valve will be momentarily opened when the nozzle is thus thrown on the ground, as would be the case if the valve operating lever were unprotected.

Having thus described my invention, what I claim is:

1. In a device of the class described, a nozzle having a hooked end, a valve, and a valve operating lever pivoted to swing within the hooked end and protected thereby against damage.

2. In a device of the class described, a nozzle having a hooked end, a valve in the nozzle, a bell-crank lever pivoted to the nozzle at one side of the hook, one arm of the lever extending into the space within the hook for operating said valve and the other arm bridging the space across the hook.

3. In a device of the class described, a nozzle having a hooked end, a valve in the nozzle, a valve operating bell-crank lever pivoted to the nozzle at one side of the hook, one arm of the lever being short and extending into the space within the hook for operative engagement with said valve and the other arm bridging the space across the hook.

4. In a device of the class described, a nozzle having a hooked end, a valve in the nozzle, a valve operating lever pivoted to the nozzle at one side of the hooked end and substantially bridging the space across the hook, and a stop on the discharge side of said hooked end for preventing the lever from swinging out of the space within the hook.

5. In combination, a nozzle having a hook-shaped portion, a slidable valve piece therein comprising a head and stem, and means located within the hook portion of the nozzle for actuating said stem to unseat the valve head when the nozzle is hung over the rim of a vessel.

6. In combination, a nozzle having a hook-shaped portion, a slidable valve piece comprising a head and stem, said stem being slidable in a bore in the nozzle and projecting normally into the space within the hook-shaped portion of the nozzle, and a double armed lever pivoted to said nozzle, one arm of the lever extending across the space within the hook and the other arm being adapted to engage and actuate said stem to unseat the head of the valve.

7. In a device of the class described, a nozzle comprising a portion adapted to be attached to a pressure line, a valve in said portion adapted to be closed by pressure in the line, a stem on the valve extending axially through said portion, a hook-shaped delivery end for the nozzle extending to one side of the said stem, and means within the space enclosed by the hook-shaped end for moving said stem against the pressure on the valve, said means being so positioned as to be operable by engagement with the rim of a vessel when the nozzle is positioned to discharge into the vessel.

8. In a device of the class described, a nozzle having a threaded end adapted to be attached to a pressure line and a relatively restricted bore at one end of which there is a valve seat, a valve member for engaging said seat, a stem for said valve movable in said bore and having an integral deflecting flange adjacent the opposite end of said bore, said stem projecting through the nozzle wall, said nozzle having a hooked end from which the water is discharged, and a lever on the exterior of said nozzle within said hooked end and protected thereby, said lever cooperating with said stem to effect the opening of said valve.

In testimony whereof, I hereunto affix my signature.

FRED E. HANSEN.